(12) United States Patent
Wang (10) Patent No.: US 7,236,138 B2
(45) Date of Patent: Jun. 26, 2007

(54) EXTERNALLY POWERED NEGATIVELY REFRACTING PHOTONIC BANDGAP MEDIUM

(75) Inventor: Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 10/949,158

(22) Filed: Sep. 24, 2004

(65) Prior Publication Data

US 2006/0066493 A1   Mar. 30, 2006

(51) Int. Cl.
  *H01Q 19/06* (2006.01)
  *H01Q 19/00* (2006.01)
  *H01Q 15/02* (2006.01)
  *H01Q 15/24* (2006.01)

(52) U.S. Cl. .................. 343/754; 343/756; 343/909

(58) Field of Classification Search ............... 343/754, 343/909, 911 R, 753, 756
See application file for complete search history.

(56) References Cited

U.S. PATENT DOCUMENTS

| 6,542,682 | B2 * | 4/2003 | Cotteverte et al. | 385/125 |
| 6,821,903 | B2 * | 11/2004 | Cotteverte et al. | 438/706 |
| 2003/0227415 | A1 | 12/2003 | Joannopoulos et al. | |
| 2004/0150873 | A1 * | 8/2004 | Pearsall | 359/321 |

OTHER PUBLICATIONS

Luo C et al—"Subwavelength Imaging in Photonic Crystals"—Physical Review B—vol. 68 No. 4—Jul. 15, 2003.
Ramakrishna S A et al—"Removal of Absorption and Increase in Resolution in a Near-Field Lens Via Optical Gain"—Physical Review B—vol. 67 No. 20—May 15, 2003.
Berrier A et al—"Negative Refraction at Infrared Wavelengths in a Two-Dimensional Photonic Crystal"—Physical Review Letters—APS USA—vol. 93 No. 7—AUg. 13, 2004.
M Mulot et al—Low-Loss InP-Based Photonic-Crystal Waveguides Etched With Ar/Cl2 Chemically Assisated Ion Beam Etching—Journal Of Vacum Science & Technology B—Mar. 2003.
Zhang X—"Active Lens Realized By Two-Dimensional Photonic Crystal"—Physics Letters A—vol. 337 No. 4-6—Apr. 11, 2005.
Luo et. al., "All-Angle Negative Refraction Without Negative Effective Index," Physical Review B, vol. 65, pp. 201104-1-201104-4 (2002).
Lee et. al., "Investigation of the Optical Losses in Photonic Crystal Laser Cavities by Varying the Number of Lattice Periods," ThB5, International Semiconductor Laser Conference, Garmisch-Partenkirchen, Germany (2002).
Lin et. al., "Highly Dispersive Photonic Band-Gap Prism," Optics Letters, vol. 21, No. 21, Optical Society of America (Nov. 1, 1996).
Parimi et. al., "Imaging By Flat Lens Using Negative Refraction," Nature, vol. 426, p. 404 (Nov. 27, 2003).
Ryu et. al. " Room-Temperature Optical Characterization of Two-Dimensional Photonic Band Gap Lasers at 1.55 um", CTuA53 pp. 175-176, Conference on Lasers and Electro Optics (CLEO) 2000, San Francisco, (2000).

(Continued)

*Primary Examiner*—Shih-Chao Chen (57) ABSTRACT

An electromagnetic medium is described, the electromagnetic medium comprising a periodic array patterned to provide at least one photonic bandgap and to provide negative refraction for incident radiation at an operating frequency lying within the at least one photonic bandgap. The periodic array includes an externally powered gain material having an amplification band that includes the operating frequency.

35 Claims, 4 Drawing Sheets

OTHER PUBLICATIONS

Berrier et. al., "Negative Refraction at Infrared Wavelengths in a Two-Dimensional Photonic Crystal," Physical Review Letters, vol. 93, No. 7, pp. 073902-1-073902-4 (Aug. 13, 2004).

Painter et. al., "Room Temperature Photonic Crystal Defect Lasers at Near-Infrared Wavelengths in InGaAsP," Jourbal of Lightwave Technology, vol. 17, No. 11, pp. 2082-2088 (Nov. 1999).

Painter et. al., "Two-Dimensional Photonic Band-Gap Defect Mode Laser," Science vol. 284, pp. 1819-1821 (Jun. 11, 1999).

Lee, Y.H., and Ryu, H.Y., "Custom Crystals Control Photons: The Optical Properties of Two-Dimensional Photonic Crystal Lasers Can Be Tailored to Needs of the Customer," IEEE Circuits and Devices Magazine, pp. 8-15 (May 2002).

* cited by examiner

EXTERNALLY POWERED NEGATIVELY REFRACTING PHOTONIC BANDGAP MEDIUM

FIELD

This patent specification relates generally to the propagation of electromagnetic radiation and, more particularly, to negatively refracting photonic bandgap media.

BACKGROUND

A photonic bandgap medium comprises an artificially engineered periodic dielectric array having at least one photonic bandgap, i.e., a range of frequencies in which ordinary electromagnetic wave propagation is strictly forbidden. The presence of these photonic bandgaps can be used to confine and guide electromagnetic waves for any of a variety of useful purposes. Guiding and confinement is achieved by the judicious introduction of defect regions, i.e., missing or differently-shaped portions of the periodic array, within which the electromagnetic waves are permitted to exist and wherealong the electromagnetic waves can be confined and guided.

Photonic bandgap media can also be engineered to provide negative refraction for incident electromagnetic radiation propagating therethrough. Such negatively refracting photonic bandgap media can be realized even though all of their component materials are intrinsically of positive refractive index. Unlike with homogeneous positively refracting material, the electromagnetic field within a negatively refracting photonic bandgap medium is highly modulated and cannot be described by a simple ray diagram. However, from a system-level viewpoint, optical performance can be at least partially characterized by assigning the negatively refracting photonic bandgap medium with a negative index of refraction at interfaces with surrounding media.

Due to the dispersive nature of photonic bandgap media and the manner in which negative refraction can be associated therewith, a broader sense of the term photonic bandgap is used herein. In particular, whereas some may refer to a photonic bandgap as a frequency range of width W between 3 db stop-band points around a center frequency, the term photonic bandgap herein refers to a broader frequency range therearound, e.g., a frequency range of width 2 W.

Among other uses, a negatively refracting photonic bandgap medium can be used to form a flat lens, a flat slab of material that behaves like a lens and focuses electromagnetic waves to produce a real image. Flat lenses can be potentially advantageous in that, unlike curved homogenous-material optical lenses, there is no diffraction limitation that limits focusing of the light onto an area no smaller than a square wavelength. Instead, light can be focused onto a very tight area even smaller than a square wavelength. Another potential advantage is that, unlike with curved homogenous-material optical lenses, there is no central axis and therefore many alignment difficulties are obviated. Accordingly, so-called "photonic bandgap superlenses" are great candidates for very small-scale optical circuits. It is to be appreciated, however, that the scope of the present teachings is not limited to flat-lensing applications, and a wide variety of other uses and devices can be achieved according to the present teachings.

One issue that arises in the realization of useful devices from negatively refracting photonic bandgap media relates to substantial losses experienced by the incident electromagnetic signal when propagating therethrough. Accordingly, it would be desirable to reduce signal loss in negatively refracting photonic bandgap media. It would be further desirable to provide a general approach to reducing such losses that can be applied to a variety of negatively refracting photonic bandgap media operating across a variety of different spectral ranges.

SUMMARY

In accordance with an embodiment, an electromagnetic medium is provided, the electromagnetic medium comprising a periodic array patterned to provide at least one photonic bandgap and to provide negative refraction for incident radiation of at least one frequency therein. The periodic array includes an externally powered gain material having an amplification band that includes the operating frequency.

A method for propagating electromagnetic radiation at an operating frequency is also provided, comprising placing a photonic bandgap medium in the path of the electromagnetic radiation, the photonic bandgap medium having a photonic bandgap that includes the operating frequency. The photonic bandgap medium is configured to provide negative refraction for electromagnetic radiation at the operating frequency, and comprises a gain material. The method further comprises pumping the gain material using power from an external power source.

A photonic bandgap medium is also provided, comprising a periodic array patterned to provide at least one photonic bandgap and to provide negative refraction for incident electromagnetic radiation of at least one frequency therein as the electromagnetic radiation propagates through the photonic bandgap medium. The photonic bandgap medium further comprises amplifying means for providing gain and/or reduced loss for the propagating electromagnetic radiation by stimulated photonic emission. The amplifying means is distributed within the periodic array along a propagation path of the electromagnetic radiation. The photonic bandgap medium further comprises means for transferring external power to the amplifying means.

Also provided is a method for fabricating an optical medium, comprising forming a vertical arrangement of material layers upon a substantially planar semiconductor substrate. The vertical arrangement includes an upper cladding layer, an active layer, and a lower cladding layer having refractive indices selected to facilitate vertical confinement of a horizontally propagating optical signal at an operating frequency. An upper ohmic contact layer above the vertical arrangement, and a lower ohmic contact layer below the semiconductor substrate, are formed. The method further comprises etching a horizontally extending periodic pattern of voids through the vertical arrangement of material layers. Each void vertically extends at least through the upper cladding layer, the active layer, and the lower cladding layer. The pattern of voids is configured and dimensioned such that when (i) the voids are occupied by a selected dielectric medium having a refractive index different than an effective refractive index of the vertical arrangement of material layers, and (ii) a nominal electrical pump current is flowing through the active layer, the optical medium exhibits at least one photonic bandgap including the operating frequency and provides negative refraction for the horizontally propagating optical signal at the operating frequency.

Also provided is an optical circuit comprising a source waveguide, a flat lens, and a receiving waveguide, the flat lens having an input surface and a focal distance. The source waveguide guides an optical signal to the input surface of the flat lens, and the flat lens focuses the optical signal at a focal location separated from the input surface by the focal distance. The receiving waveguide has an input location sufficiently near the focal location to receive the focused optical signal, and the flat lens comprises an externally powered gain medium.

DETAILED DESCRIPTION

Figure 1:
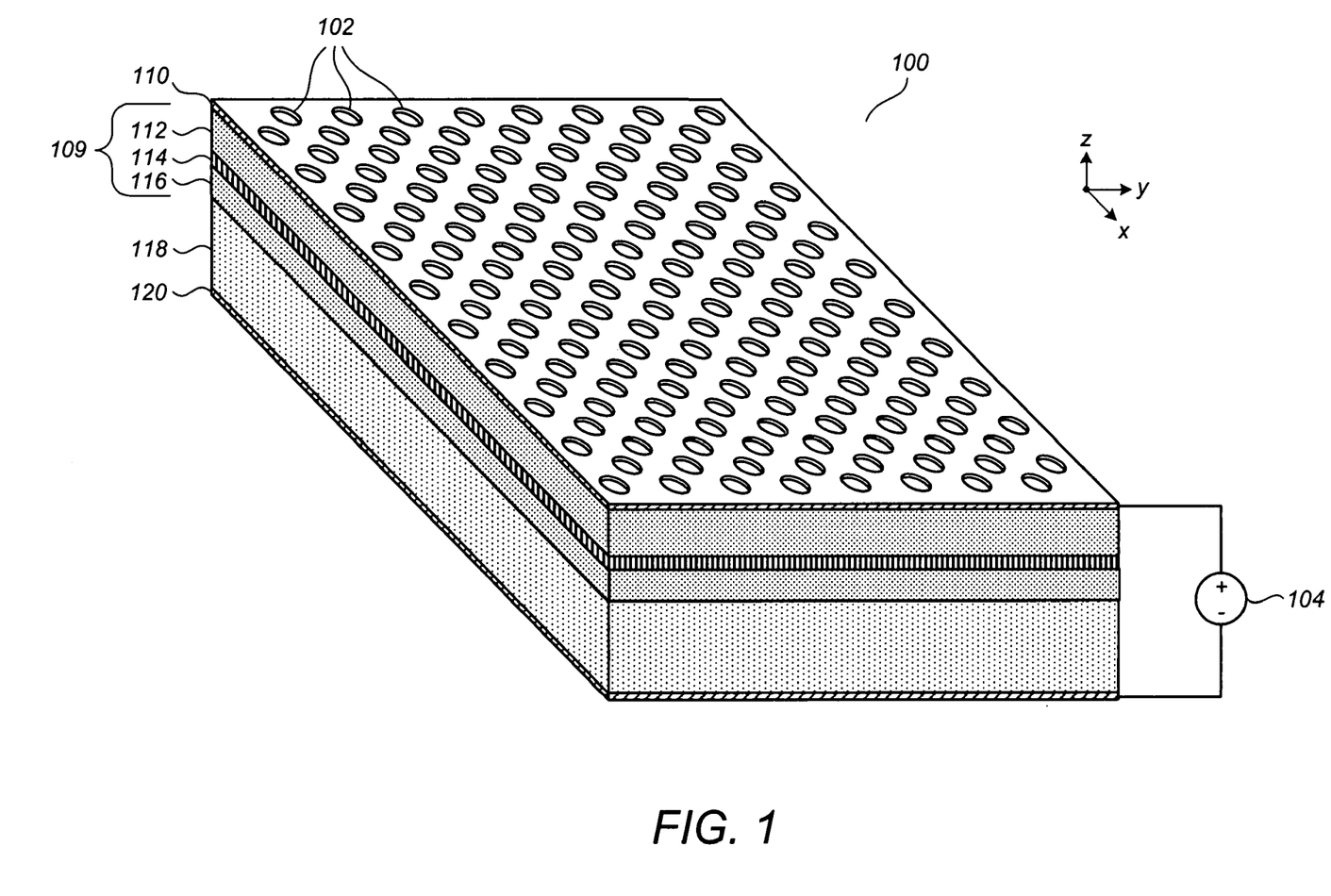
FIG. 1 illustrates a perspective view of a photonic bandgap medium according to an embodiment.
Figure 2:
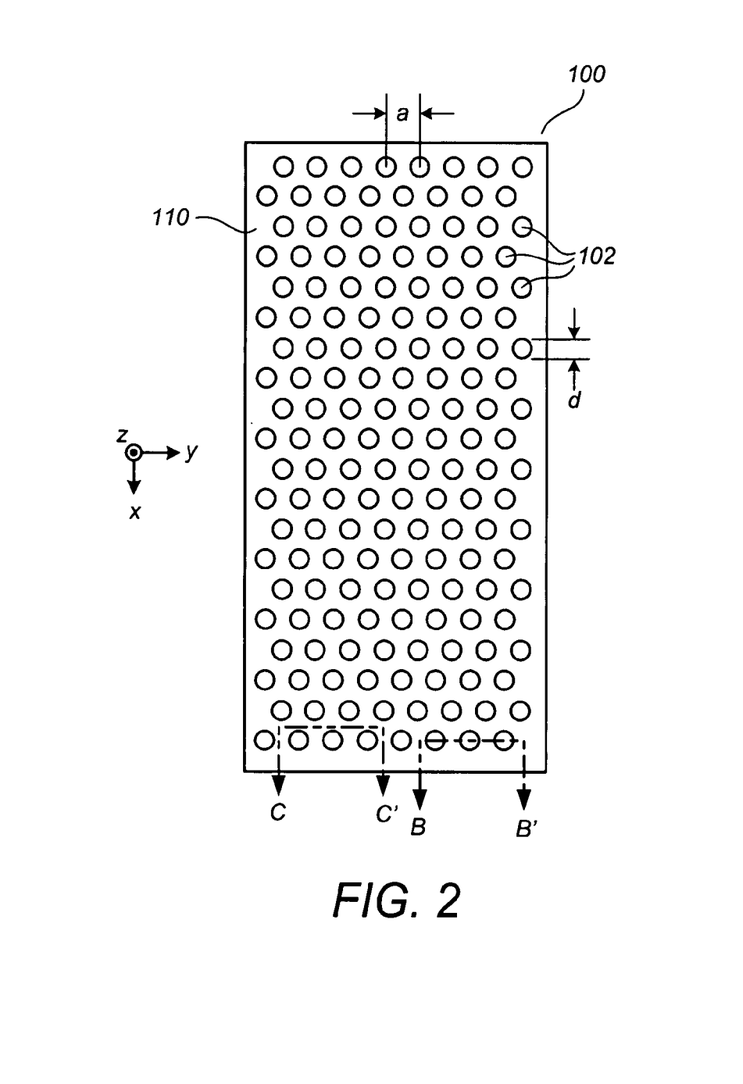
FIG. 2 illustrates a top view of the photonic bandgap medium of FIG. 1.
Figure 3:
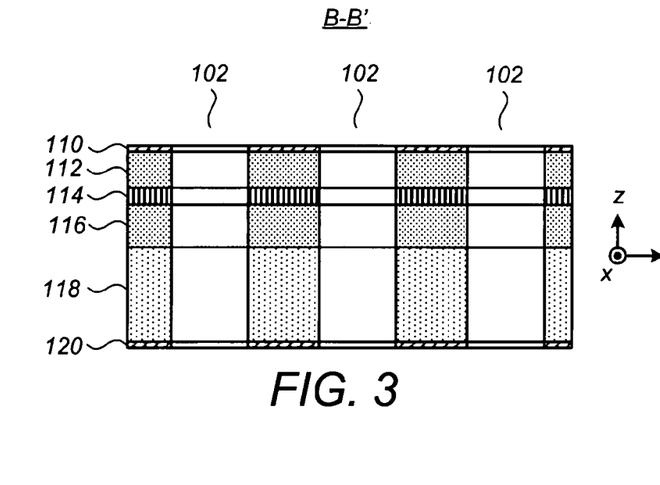
FIG. 3 illustrates a first cross-sectional view of the photonic bandgap medium of FIG. 1.
Figure 4:
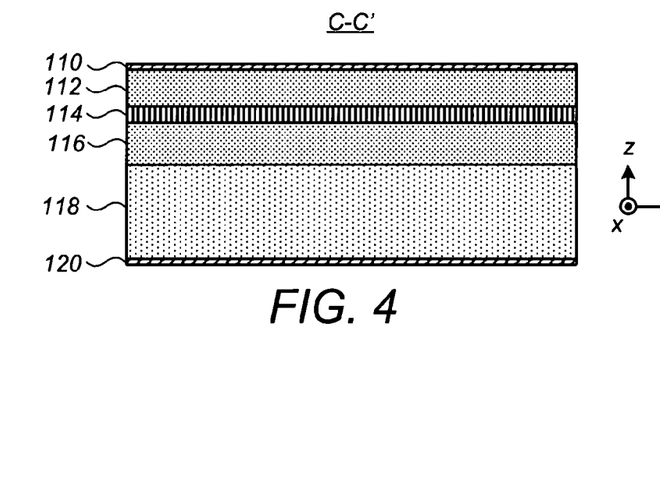
FIG. 4 illustrates a second cross-sectional view of the photonic bandgap medium of FIG. 1.

FIG. 1 illustrates a perspective view of a photonic bandgap medium 100 according to an embodiment. FIG. 2 illustrates a top view of the photonic bandgap medium 100, while FIGS. 3 and 4 illustrate cross-sectional views of the photonic bandgap medium 100 taken at sections B-B' and C-C', respectively. Photonic bandgap medium 100 comprises a semiconductor structure 109 formed on a semiconductor substrate 118. The semiconductor structure 109 comprises a vertical arrangement of semiconductor layers including an upper cladding layer 112, an active layer 114, and a lower cladding layer 116. In the example of FIG. 1, the electromagnetic radiation is intended to propagate in the y direction (or the x direction) and is vertically confined around the active layer 114. The vertical confinement is achieved by providing the cladding layers 112 and 114 with lower refractive indexes than the active layer 114. Photonic bandgap medium 100 further comprises an upper ohmic contact 110 formed above the semiconductor structure 109 and a lower ohmic contact 120 formed below the semiconductor substrate 118. The ohmic contacts 110 and 120 are coupled to an external electrical power source 104.

A periodic array of generally-cylindrical air holes 102 is formed through the stack of material layers 110-120 as shown in FIG. 1. In other embodiments, the voids forming the air holes 102 may be instead be filled with any of a variety of continuous materials or material structures, provided that their content has an effective refractive index different than that of the semiconductor structure 109. In another embodiment (not shown), voids are only formed through the semiconductor structure 109 itself, and there may layers above and below the semiconductor structure 109 that do not contain voids. Notably, these "subsurface voids" should be filled with an appropriately-indexed material that maintains proper vertical confinement around the active layer 114.

In operation, electrical current flows via the ohmic contacts 110 and 120 through the active layer 114 to electrically pump the active layer 114. In an alternative embodiment (not shown) the ohmic contacts 110 and 120 can be omitted and the active layer 114 can be optically pumped from an external pump light source. Preferably, the pump light has a frequency that lies within the amplification band of the active layer 114 but that is sufficiently different from the operating frequency to avoid adverse interaction with the propagating radiation. By way of example, if the operating frequency corresponds to a free-space wavelength of 1550 nm, in one embodiment the pump light would be provided at a frequency corresponding to a free-space wavelength of 980 nm-1300 nm.

The semiconductor structure 109 represents a first effective index structure into which repeating patterns of a second effective index structure are formed, the second effective index structure being the cylindrical air holes 102 in this example. According to an embodiment, the materials for the first and second effective index structures, as well as the shape and configuration of the repeating patterns, are selected such that the photonic bandgap medium 100 exhibits at least one photonic bandgap. The materials for the first and second effective index structures, as well as the shape and configuration of the repeating patterns, are further selected to provide for negative refraction at an operating frequency that lies within the photonic bandgap.

That negatively refracting photonic bandgap materials are realizable is discussed, for example, in Luo et. al., "All-Angle Negative Refraction Without Negative Effective Index," Physical Review B, Volume 65 at 201104-1-201104-4 (2002), and in US 2003/0227415A1. The latter document discusses propagation of radiation across a photonic crystal material designed to be negatively refracting, and discusses a principle of amplified transmission of evanescent waves.

According to an embodiment, the materials for the first and/or second effective index structures are yet further selected to include a gain medium, the gain medium being powered by an external power source. Most generally, the gain medium can comprise any material capable of using energy from a source other than the propagating electromagnetic signal itself to provide gain and/or to reduce loss in the propagating electromagnetic signal, such as by stimulated photon emission.

By way of example, for a semiconductor-based photonic bandgap medium, the gain medium can comprise active layers similar to those used in semiconductor optical amplifiers (SOAs), edge-emitting lasers, vertical cavity surface emitting lasers (VCSELs), or similar devices. The active layers can include bulk active material and/or multi-quantum well structures based, for example, on III-V material systems. In one embodiment in which the operating frequency corresponds to a free-space wavelength lying between 1480 nm-1610 nm, the active layer comprises a MQW structure according to an InP/InGaAsP/InGaAs material system. In another embodiment in which the operating frequency corresponds to a free-space wavelength lying between 700 nm-1300 nm, the active layer comprises a MQW structure according to a GaAs/AlGaAs/InGaAsN material system. In another embodiment in which the operating frequency corresponds to a free-space wavelength lying between 400 nm-700 nm, the active layer comprises a MQW structure according to a GaN/InGaN/AlGaN material system. In the case of MQW structures, electrical power is provided from an external power source for pumping the active material. In the case of bulk active materials, electrical or optical pumping power can be provided.

By way of further example, for a glass-based photonic bandgap medium, the gain medium can comprise an erbium-doped glass material similar to that used in erbium-doped fiber amplifiers (EDFAs), or other rare-earth-doped glass material. The external energy is provided to the gain medium using a free-space beam of pump light.

It is to be appreciated that the particular materials and parameters given in the context of the present teachings are presented by way of example and not by limitation. For example, many of the numerical device dimensions are dependent upon the particular choice of materials and on the operating frequency. Indeed, even the particular level of electrical current through the active layer, or the intensity of external pump light provided, may affect the width and/or location of the photonic bandgap(s) themselves. Accordingly, the numerical examples presented below should be understood as starting points in empirical parameter determinations for operable devices, such empirical determinations being achievable without undue experimentation by one skilled in the art in view of the present disclosure.

In one embodiment, the air holes 102 have a common diameter "d" and form a repeating triangular lattice having a lattice constant "a," whereby the center of a given air hole 102 and the centers of two adjacent nearest-neighbor air holes 102 define an equilateral triangle of side "a." By way of non-limiting example, in one embodiment consistent with an operating frequency corresponding to a free-space wavelength of 1550 nm, the diameter "d" is in the neighborhood of 250 nm while the lattice constant "a" is in the neighborhood of 480 nm.

Fabrication of a photonic bandgap medium similar to that of FIG. 1 and having an operating frequency corresponding to a free-space wavelength near 1550 nm and using a MQW gain medium is described, it being understood that analogous processes are used for other frequencies of operation. Starting with an InP semiconductor substrate 118, the semiconductor structure 109 is formed thereon using methods similar to those for fabricating SOA devices and, for the MQW structure of the active layer 114, VCSEL devices. The lower cladding layer 116 is formed with n-InP and is approximately 1 μm thick. A MQW structure according to an InP/InGaAsP/InGaAs material system having an overall thickness of approximately 100 nm is formed for the active layer 114.

The upper cladding layer is formed with p-InP and is approximately 1 μm thick. The upper ohmic contact 110 is a p-ohmic contact roughly 200-500 nm thick, and the lower ohmic contact 120 is an n-ohmic contact roughly 200-500 nm thick. It is preferred that the upper cladding layer be at least 1 μm thick so that the substantially metallic p-ohmic layer does not substantially disturb the photonic bandgap or the negatively refractive characteristics of the device, i.e., so that the p-ohmic layer 110 is sufficiently distant from the active layer 114. The electrical polarity of the overall device can be reversed such that current flows in the opposite direction between ohmic contacts, in which case the cladding and ohmic contact materials above the active layer 114 are n-doped, and the cladding and ohmic contact materials below the active layer 114 are p-doped.

The air holes 102 are then chemically etched through the stack of material layers 110-120. Preferably, an anisotropic etch is performed to provide sufficiently cylindrical shape to the air holes 102.

Figure 5:
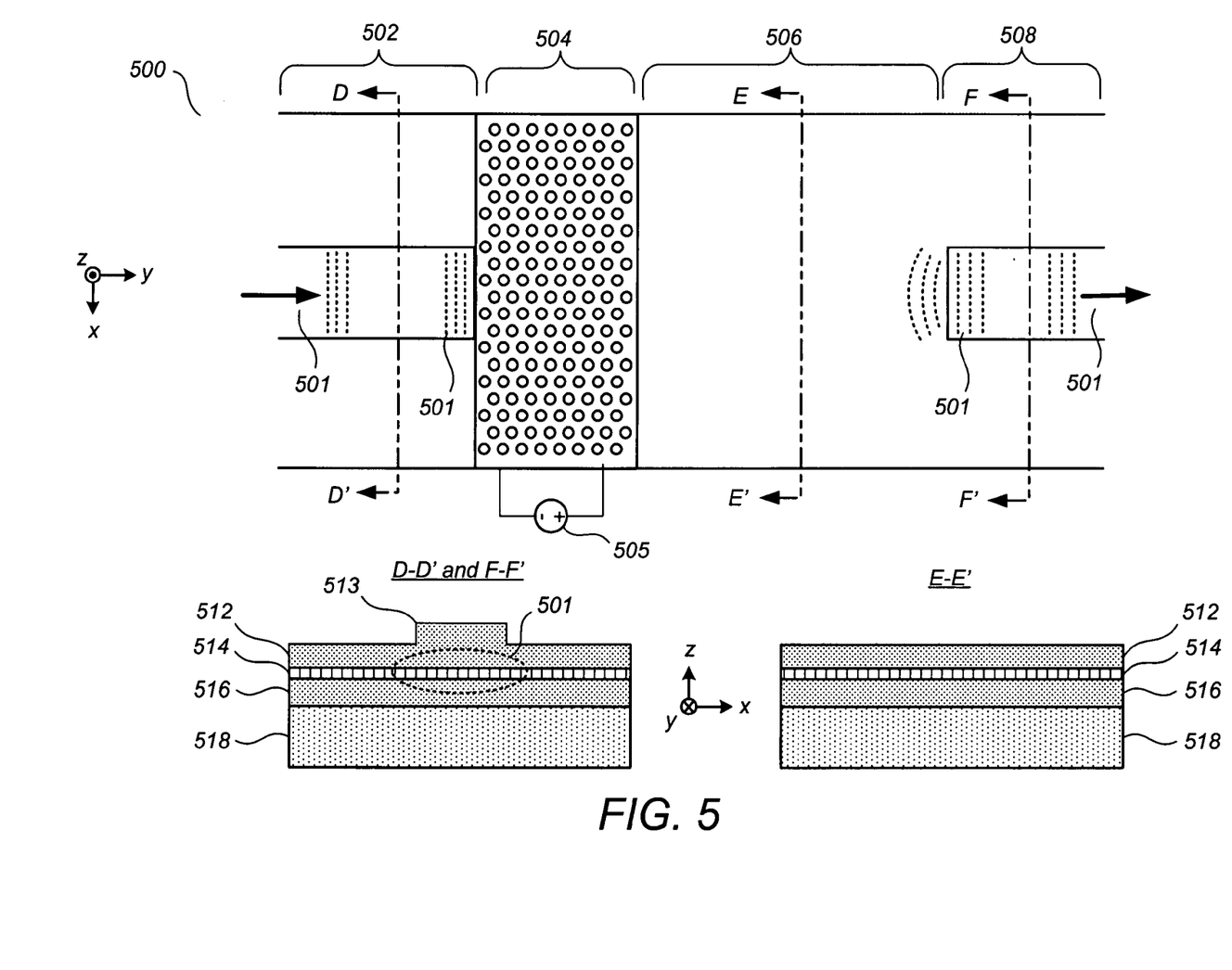
FIG. 5 illustrates an example of an optical circuit incorporating a photonic bandgap medium according to an embodiment including views of selected cross-sections therealong.

FIG. 5 illustrates an optical circuit 500 including a flat lens 504 formed from an externally powered negatively refracting photonic bandgap medium according to an embodiment, the flat lens 504 being powered by an external electrical power source 505. The flat lens 504 has a substantially similar structure as the photonic bandgap medium 100 of FIG. I and has an operating frequency corresponding to a free-space wavelength of 1550 nm.

Optical circuit 500 comprises a source waveguide 502 guiding a single-mode optical signal 501 in the +y direction to a first interface of the flat lens 504. Optical circuit 500 further comprises an intermediate region 506 extending from a second interface of the flat lens 504 to a receiving waveguide 508. The source and receiving waveguides 502 and 508 are similar in structure to each other and comprise material layers 512, 516, and 518 substantially identical to corresponding layers 112, 116, and 118 shown in FIG. 1. However, instead of active layer 114 there is a layer 514 that is inactive but that has an index of refraction substantially identical to that of active layer 114. Additionally, a ridge 513 is grown to provide lateral confinement, the ridge 513 being approximately 1 μm-3 μm wide. Intermediate region 506 has a structure substantially identical to the source and receiving waveguides 502 and 508 except that the ridge 513 is not provided. The formation of the overall optical circuit 500 can be achieved concurrently with the formation of the flat lens 504, with the inactive layer 514 being realized via selective epitaxial growth of the active region 114. Alternatively, the inactive layer 514 can be realized by concurrent formation with the active region 114 followed by an alloy mixing process to provide both deactivation and substantial transparency. By way of example and not by way of limitation, the length of the intermediate region can be on the order of 10 μm.

In operation, the flat lens 504 operates to focus the optical signal 501 onto the receiving waveguide 508. In one embodiment, the focal distance of the flat lens 504 can be modulated or "tuned" by varying the power provided by the external power source 505. In another embodiment, the optical signal 501 can be time-modulated using the flat lens 504 by time-modulating the amount of power provided by the external power source 505.

Figure 6:
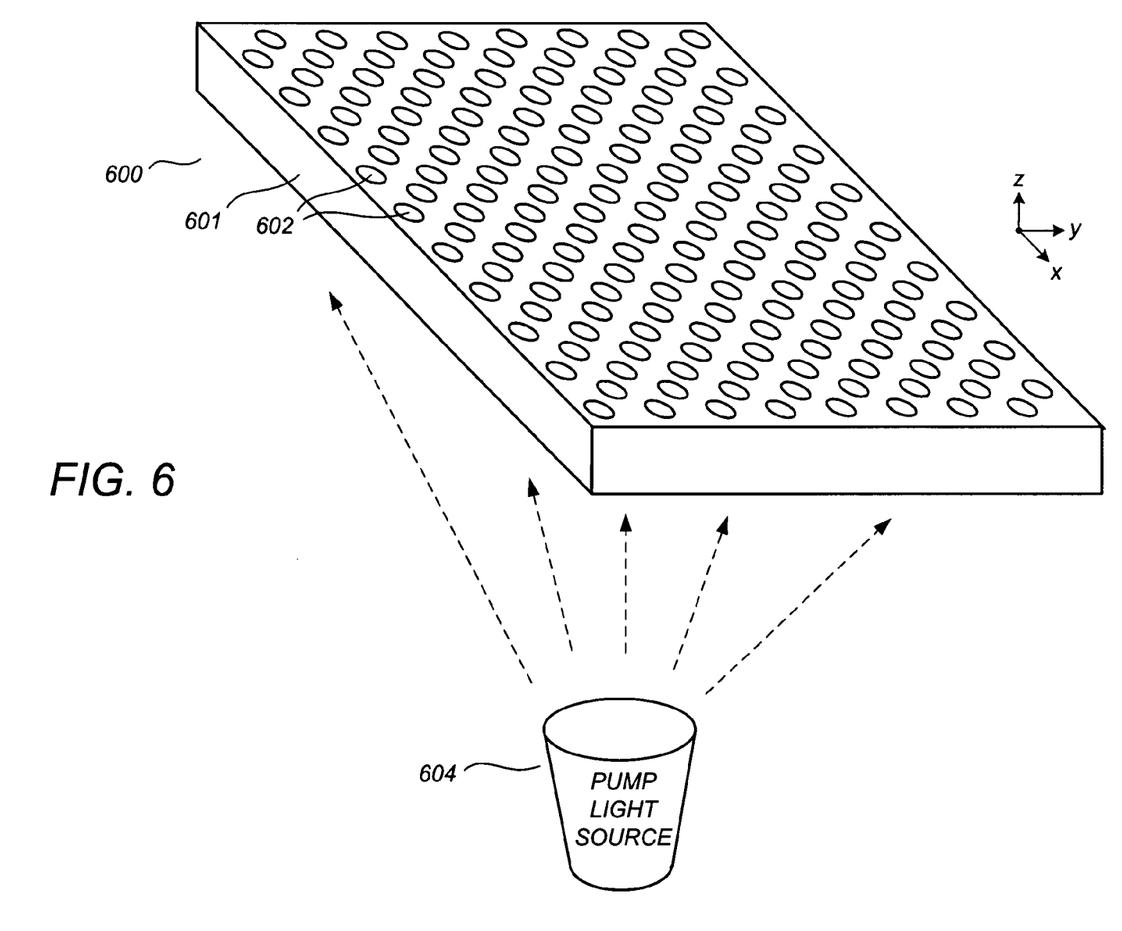
FIG. 6 illustrates a perspective view of a photonic bandgap medium according to an embodiment.

FIG. 6 illustrates a perspective view of a photonic bandgap medium 600 according to an embodiment, comprising an erbium-doped glass slab 601 into which air holes 602 are patterned. An external pump light source 604 provides a free-space beam of light to pump the erbium-doped glass material to a condition sufficient for stimulated photonic emission. Signal modulation and/or flat lens focal length variation can be achieved by time-varying the amount of pump light provided. Any of a variety of other rare-earth metal dopants can be used for achieving other operating wavelengths.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of a "two-way" patterned device, e.g., using (i) a semiconductor structure with (ii) air holes, it is to be appreciated that patterns of additional material may be included in the periodic array to form a "three-way" patterned device, a "four-way" patterned device, and so on, without departing from the scope of the present teachings.

By way of further example, while some embodiments supra are discussed in terms of a two-dimensionally extending periodic array, the scope of the present teachings is not necessarily so limited. The principles and advantages of the present teachings can be applied in the context of a three-dimensional negatively refracting photonic bandgap medium such as that discussed in US 2003/0227415A1, supra. Thus, reference to the details of the described embodiments are not intended to limit their scope.

What is claimed is:

1. An electromagnetic medium comprising a periodic array patterned to provide at least one photonic bandgap and to provide negative refraction for incident radiation of at least one frequency therein, wherein said periodic array includes an externally powered gain material having an amplification band that includes said frequency.

2. The electromagnetic medium of claim 1, wherein said periodic array extends in two dimensions and said incident radiation has a substantially planar propagation therethrough.

3. The electromagnetic medium of claim 2, wherein said gain material is electrically pumped using energy from an external electrical source.

4. The electromagnetic medium of claim 2, wherein said gain material is optically pumped using pump light from an external pump light source.

5. The electromagnetic medium of claim 2, said periodic array comprising a first effective index structure into which repeating patterns of a second effective index structure are formed, wherein said first effective index structure comprises one of a semiconductor structure and a glass material.

6. The electromagnetic medium of claim 5, wherein said second effective index structure comprises an air column.

7. The electromagnetic medium of claim 6, wherein said first effective index structure comprises at least one of an Erbium-doped glass and a glass doped with another rare earth metal, said first effective index structure being optically pumped using pump light from an external pump light source.

8. The electromagnetic medium of claim 2, said gain material comprising a semiconductor active layer, said periodic array comprising a plurality of semiconductor layers including said active layer and at least two cladding layers, each cladding layer having an effective index less than an effective index of said active layer, wherein said active layer comprises one of a III-V bulk active material and a III-V multi-quantum well (MQW) structure.

9. The electromagnetic medium of claim 8, wherein a periodic pattern of air holes is formed into said plurality of semiconductor layers.

10. The electromagnetic medium of claim 8, wherein said frequency corresponds to a free-space wavelength near 1550 nm, and wherein said active layer comprises a MQW structure according to an InP/InGaAsP/InGaAs material system.

11. The electromagnetic medium of claim 8, wherein said frequency corresponds to a free-space wavelength lying between 1480 nm-1610 nm, and wherein said active layer comprises a MQW structure according to an InP/InGaAsP/InGaAs material system.

12. The electromagnetic medium of claim 8, wherein said frequency corresponds to a free-space wavelength lying between 700 nm-1300 nm, and wherein said active layer comprises a MQW structure according to a GaAs/AlGaAs/InGaAsN material system.

13. The electromagnetic medium of claim 8, wherein said frequency corresponds to a free-space wavelength lying between 400 nm-700 nm, and wherein said active layer comprises a MQW structure according to a GaN/InGaN/AlGaN material system.

14. A method for propagating electromagnetic radiation at an operating frequency, comprising:
placing a photonic bandgap medium in the path of the electromagnetic radiation, the photonic bandgap medium having a photonic bandgap that includes the operating frequency and being configured to provide negative refraction for electromagnetic radiation at the operating frequency, the photonic bandgap medium comprising a gain material; and
pumping the gain material using power from an external power source.

15. The method of claim 14, wherein said pumping comprises electrically pumping the gain material using energy from an external electrical source.

16. The method of claim 14, wherein said pumping comprises optically pumping the gain material using pump light from an external pump light source.

17. The method of claim 14, further comprising time-modulating an amplitude of said electromagnetic radiation by varying an amount of power provided to the gain material from the external power source.

18. The method of claim 14, said photonic bandgap medium being configured to form a flat lens, further comprising varying an amount of power provided to the gain material from the external power source to time-modulate a focal distance of said flat lens.

19. A photonic bandgap medium, comprising:
a periodic array patterned to provide at least one photonic bandgap and to provide negative refraction for incident electromagnetic radiation of at least one frequency therein as the electromagnetic radiation propagates therethrough;
amplifying means for providing, by stimulated photonic emission, one of gain and reduced loss for said propagating electromagnetic radiation, said amplifying means being distributed within said periodic array along a propagation path of said electromagnetic radiation; and
means for transferring external power to said amplifying means.

20. The photonic bandgap medium of claim 19, wherein said amplifying means is powered by an electrical current.

21. The photonic bandgap medium of claim 19, wherein said amplifying means is powered by an optical pump light beam.

22. The photonic bandgap medium of claim 19, wherein said periodic array extends in two dimensions, and wherein said propagation path is substantially planar.

23. The photonic bandgap of claim 22, said periodic array comprising a first effective index structure into which repeating patterns of a second effective index structure are formed, wherein said first effective index structure comprises one of a semiconductor structure and a glass material.

24. The photonic bandgap medium of claim 23, wherein said amplifying means is integral with said first effective index structure along a plane thereof and comprises a semiconductor active layer, said active layer comprising one of a II-V bulk active material and a III-V multi-quantum well (MQW) structure.

25. The photonic bandgap medium of claim 23, wherein said second effective index structure comprises an air column.

26. The photonic bandgap medium of claim 23, wherein said amplifying means is integral with said first effective index structure and comprises at least one of an Erbium-doped glass and a glass doped with another rare earth metal, said amplifying means being optically pumped.

27. A method of fabricating an optical medium, comprising:
forming a vertical arrangement of material layers upon a substantially planar semiconductor substrate, said vertical arrangement including an upper cladding layer, an active layer, and a lower cladding layer having refractive indices selected to facilitate vertical confinement of a horizontally propagating optical signal at an operating frequency;

forming an upper ohmic contact layer above said vertical arrangement and a lower ohmic contact layer below said semiconductor substrate;

etching a horizontally extending periodic pattern of voids through said vertical arrangement, each void vertically extending at least through said upper cladding layer, said active layer, and said lower cladding layer, said pattern of voids being configured and dimensioned such that when (i) said voids are occupied by a selected dielectric medium having a refractive index different than an effective refractive index of the vertical arrangement, and (ii) a nominal electrical pump current is flowing through said active layer, said optical medium exhibits at least one photonic bandgap including said operating frequency and provides negative refraction for said horizontally propagating optical signal at said operating frequency.

28. The method of claim 27, wherein said selected dielectric medium is air, and wherein said voids are substantially cylindrical in shape.

29. The method of claim 28, wherein said forming of said upper and lower ohmic contact layers is performed previous to said etching, and wherein said cylindrical voids extend through said upper and lower ohmic contact layers.

30. The method of claim 29, further comprising coupling said upper and lower ohmic contact layers to an external electrical power source.

31. An optical circuit, comprising:

a source waveguide;

a flat lens having an input surface and a focal distance, said source waveguide guiding an optical signal to said input surface, said flat lens focusing said optical signal at a focal location separated from said input surface by said focal distance; and a receiving waveguide having an input location sufficiently near said focal location to receive the focused optical signal;

wherein said flat lens comprises an externally powered gain medium.

32. The optical circuit of claim 31, wherein said externally powered gain medium is electrically pumped using energy from an external electrical source.

33. The optical circuit of claim 31, wherein said externally powered gain medium is optically pumped using energy from an external pump light source.

34. The optical circuit of claim 31, further comprising a time-modulating device for time-modulating an amplitude of the received focused optical signal by time-modulating an amount of power provided to said externally powered gain medium.

35. The optical circuit of claim 31, further comprising a focal distance tuning device for tuning said focal distance by varying an amount of power provided to said externally powered gain medium.

* * * * *

UNITED STATES PATENT AND TRADEMARK OFFICE
CERTIFICATE OF CORRECTION

PATENT NO. : 7,236,138 B2  Page 1 of 1
APPLICATION NO. : 10/949158
DATED : June 26, 2007
INVENTOR(S) : Shih-Yuan Wang

It is certified that error appears in the above-identified patent and that said Letters Patent is hereby corrected as shown below:

In column 5, line 64, delete "FIG. I" and insert -- FIG. 1 --, therefor.

In column 8, line 52, in Claim 24, delete "II-V" and insert -- III-V --, therefor.

Signed and Sealed this

Sixth Day of October, 2009

David J. Kappos
*Director of the United States Patent and Trademark Office*